United States Patent
Shor et al.

(10) Patent No.: US 9,635,710 B2
(45) Date of Patent: Apr. 25, 2017

(54) METHOD AND APPARATUS FOR PROCESSING DATA FLOWS

(71) Applicants: Roy Shor, Tel-Aviv (IL); Ori Goren, Kibutz Ruchama (IL); Avraham Horn, Givat Shmuel (IL)

(72) Inventors: Roy Shor, Tel-Aviv (IL); Ori Goren, Kibutz Ruchama (IL); Avraham Horn, Givat Shmuel (IL)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/776,746

(22) PCT Filed: Mar. 28, 2013

(86) PCT No.: PCT/IB2013/052519
§ 371 (c)(1),
(2) Date: Sep. 15, 2015

(87) PCT Pub. No.: WO2014/155159
PCT Pub. Date: Oct. 2, 2014

(65) Prior Publication Data
US 2016/0037580 A1   Feb. 4, 2016

(51) Int. Cl.
*H04W 4/00*   (2009.01)
*H04W 88/08*   (2009.01)

(52) U.S. Cl.
CPC ................. *H04W 88/085* (2013.01)

(58) Field of Classification Search
None
See application file for complete search history.

(56) References Cited

U.S. PATENT DOCUMENTS

| | | | |
|---|---|---|---|
| 2008/0119232 A1 | 5/2008 | Oh et al. | |
| 2009/0239477 A1 | 9/2009 | Yamamoto | |
| 2011/0032910 A1 | 2/2011 | Aarflot et al. | |
| 2011/0317550 A1* | 12/2011 | Tanigawa | H04W 24/08 370/225 |
| 2012/0014421 A1* | 1/2012 | Wegener | H03M 7/40 375/219 |
| 2012/0052878 A1 | 3/2012 | Sakama | |

(Continued)

OTHER PUBLICATIONS

International Search Report and Written Opinion correlating to PCT/IB2013/052519 issued on Dec. 2, 201.

(Continued)

*Primary Examiner* — Kibrom T Hailu

(57) ABSTRACT

An apparatus for facilitating the re-distribution of processing load between a plurality of radio equipment controllers arranged in a daisy chain configuration on a Common Public Radio Interface. The apparatus may be included in each REC and has two framers which may co-operate to forward IQ data of antenna carriers received on a downlink from a preceding REC to a subsequent REC in the chain and a DMA module or channel which can read IQ data from a system memory for onward transmission. In a re-allocation mode, the framer may be reconfigured so that an AxC initially allocated to a preceding REC for processing may be instead, accessed by a second (usually redundant) transmit DMA module included in the apparatus from system memory and transferred to the framer for onward transmission.

12 Claims, 5 Drawing Sheets

(56) References Cited

U.S. PATENT DOCUMENTS

| | | | |
|---|---|---|---|
| 2012/0057572 A1* | 3/2012 | Evans | H04W 88/085 370/338 |
| 2012/0184329 A1* | 7/2012 | Yu | H04W 88/10 455/552.1 |
| 2012/0204084 A1 | 8/2012 | Zhang | |
| 2014/0094157 A1* | 4/2014 | Nguyen | H04W 88/085 455/418 |

OTHER PUBLICATIONS

Common Public Radio Interface Specification Version 4.1 (Feb. 18, 2009).
Common Public Radio Interface Specification Version 4.2 (2010).
Common Public Radio Interface Specification Version 5.0 (2011).
Freescale Semiconductor data sheet MSC8157E Nov. 2011.

* cited by examiner

METHOD AND APPARATUS FOR PROCESSING DATA FLOWS

FIELD OF THE INVENTION

This invention relates to a method and apparatus for processing data flows and particularly, though not exclusively, to such a method and apparatus for processing flow of data in cellular communications networks.

BACKGROUND OF THE INVENTION

In a typical cellular communications system, wireless user equipment units (UEs), for example, mobile phones, communicate via a radio access network to one or more core networks. A radio access network covers a geographical area which is divided into cells, with each cell area being served by a radio base station. Several base stations are connected, typically via land lines, to a control node known as a radio network controller (RNC). Such a control node supervises and coordinates various activities of the several radio base stations which are connected to it. The radio network controllers are typically connected to one or more core networks. One example of a radio access network is the Universal Mobile Telecommunications (UMTS) Terrestrial Radio Access Network (UTRAN). The UMTS is a third generation (3G) system and UTRAN is essentially a radio access network providing wideband code division multiple access (WCDMA) to user equipment units. Fourth generation systems are evolving towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network.

In many radio access networks the radio base station is a concentrated node with most of its components being located at a concentrated site. However, a radio base station can also be configured with a more distributed architecture. For example, a distributed radio base station can take the form of one or more radio equipment (RE) portions that are linked to a radio equipment control (REC) portion over an internal interface. One example of an internal interface of a radio base station which links a radio equipment portion of the radio base station to a radio equipment control portion of the base station is the Common Public Radio Interface (CPRI). The Common Public Radio Interface (CPRI) is described in Common Public Radio Interface (CPRI) Interface Specification Version 4.1 (18 Feb. 2009) and also Version 4.2 (2010) and Version 5 (2011).

The Common Public Radio Interface (CPRI) is an industry cooperation aimed at defining a publicly available specification for the key internal interface of radio base stations between radio equipment control (REC) and radio equipment (RE), thereby allowing base station manufacturers to share a common protocol and more easily adapt platforms from one customer to another. In essence, a radio base station is decomposed into two separate blocks, known as REC and RE. The REC provides access to a UMTS network, for example, via the Iub interface, whereas the RE serves as the air interface to user equipment, known as Uu in a UMTS network. The REC generally comprises the radio functions of the digital baseband domain, whereas the RE contains analogue radio frequency functions. The functional split between the REC and RE is done in such a way that a generic interface, CPRI, based on In-Phase and Quadrature (IQ) data can be defined. Several IQ data flows can be sent over one physical link with each data flow reflecting the data of one antenna for one carrier, the so-called antenna carrier "AxC." Several AxC's having the same sampling rate may be aggregated into an "AxC Group." IQ data of different antennas along with control data are multiplexed onto a transmission line. The CPRI has a basic frame structure for carrying a control word and an IQ data block. An "AxC Container" is a sub-part of the IQ data block of one basic frame. For example, an AxC Container for E-UTRAN contains one or more IQ samples for the duration of one UMTS chip or it may contain IQ sample bits and stuffing bits.

In addition to IQ data, the CPRI interface supports control and management (C & M) information which is exchanged between the control and management entities within a REC and a RE. The control and management data are either sent as inband protocol or by layer 3 protocols that reside on top of appropriate layer 2 protocols. C&M data are time-multiplexed with synchronisation data and the IQ data over the CPRI. Two different layer 2 protocols for C&M data are supported by CPRI. These are Ethernet and High-Level Datalink Control (HDLC). A vendor-specific channel may also be supported. HDLC is a protocol developed by the International Organisation for Standardisation and falls under ISO standards ISO 3309 and ISO 4335 HDLC is sometimes referred to as the slow C&M channel in CPRI (Ethernet being referred to as the fast channel) HDLC can support several data rates and operates to provide a reliable communications path between nodes with acknowledged data transfer.

The functional split between the REC and RE allows the RE to be positioned close to an associated antenna. This reduces the distance which the associated signals have to travel before they are received by the RE, thereby negating the need for tower-mounted amplifiers and antenna system controllers. The link between the RE and REC is generally optical, allowing the link length to be much greater when compared with wired coaxial systems. Therefore, the distance between the RE and RRC can be up to 40 Km, thereby increasing the flexibility of deployment of RE's within the network when utilising CPRI. One REC may be linked to two or more REs in a chain topology with each RE being configured to forward data to other REs in the chain. Similarly, an RE may be linked to multiple REC's in a chain topology with each REC being configured to forward data to other REC's in the chain.

Many of the functions which an REC has to perform, which include channel coding/encoding, spreading/despreading, frame and time slot generation, for example, may be realised by a proprietary digital signal processing device. Two examples of such DSP devices which support the CPRI are the Freescale B4860 and the Freescale MSC8157 Broadband Wireless, Access Six Core DSP which is described in Freescale Semiconductor Data Sheet MSC8157E, November 2011. This Digital Signal Processor includes (inter alia) a CPRI unit which includes a "framer" module which handles the transmission and reception of all IQ data, and a DMA (direct memory access) module associated with the framer which transfers the receive and transmit IQ data to and from antenna carrier buffers in a memory. The framer is provided with an auxiliary interface so that chain topologies can be supported. A typical CPRI unit contains receive and transmit configuration tables that determine which AxC's in a frame to transfer to or fetch from system memory and their location in the basic frame or hyperframe. For daisy chain configurations, each CPRI unit may utilise receive mask registers with the masking of bits of the auxiliary interface.

For example, if a masking bit is "set" then data coming from the framer of a second CPRI unit is sent to a subsequent RE or REC in the chain (sometimes referred to as "forward mode"). Conversely, if the masking bit is "cleared" then the data read from the system memory is sent to a subsequent RE or REC in the chain (sometimes referred to as "local mode"). The auxiliary mask is therefore only used in daisy chain configurations.

Current CPRI controllers define the allocation of AxC per each REC pseudo-statically, that is, the IQ allocation for the different RECs in a chain is static, and any change takes approximately 10 ms. Reconfiguration of the IQ allocation involves both the REC-chain and the RE-chain, that is to say, that the RE-chain reconfiguration is mutually dependent on the REC-chain reconfiguration. Usually, CPRI can transfer larger BW than one device can process which is why REC chaining is used whereby each REC processes part of the data. However, actual loading of a communications cell can vary. For example, a cell may be much less loaded during the night time than during the day so that in some circumstances fewer AxCs would require processing during a particular operational period. Therefore, it would be advantageous to be able to dynamically reconfigure the allocation of AxCs between chained RECs so that in quiet periods, one or more RECs could be powered down thereby reducing overall power consumption of the base station system.

SUMMARY OF THE INVENTION

The present invention provides a system and method for processing data flows as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Figure 1:
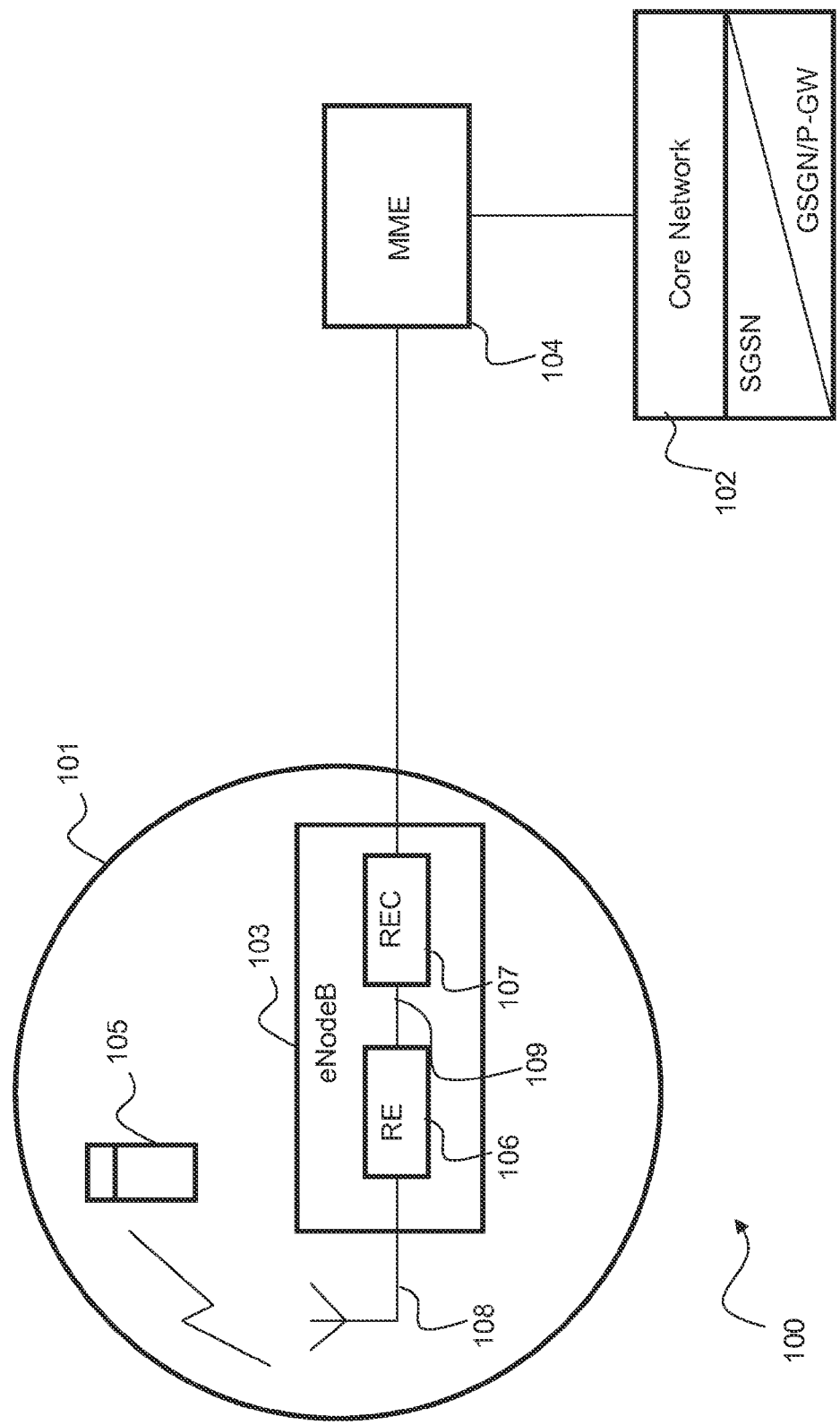
FIG. 1 is a simplified schematic diagram of a wireless communication system including an example of an apparatus for processing data flows.

Referring now to FIG. 1, an example of part of an E-UTRAN wireless communication system including an example of a system for processing data flows is illustrated and indicated generally at 100 and comprises an LTE macro cell whose coverage area is indicated at 101. A core network 102 of the E-UTRAN wireless communications system of FIG. 1 includes a Gateway General Packet Radio System (GPRS) Support Node (GGSN) and a Serving GPRS Support Node (SGSN). The GGSN or SGSN is responsible for interfacing the E-UTRAN wireless communication system 100 with a packet data network, for example a Public Switched Data Network (PSDN), (such as the internet) or a Public Switched Telephone Network (PSTN). The SSGN performs a routing and tunnelling function for traffic to and from the macrocell 101 while the GGSN links with external packet networks. In an Evolved Packet Core, the equivalent node to a GSGN is a Packet Gateway (P-GW) and in FIG. 1 they are shown combined. In this example, the LTE macrocell 102 is served by an eNode B 103. The eNode B 103 is linked to the Core Network 102 through a Mobility Management Entity (MME) 104. The MME 104 handles signalling control; and mobility.

Typically, the eNode B 103 may be arranged to receive signals coming from a User Equipment 105 located in the macrocell 101 and down-convert them to digital data. Encoded signals are then brought back to baseband before being transmitted to the terrestrial network (that is the core network 102). Similarly, the eNode B 103 may be arranged to receive signals from the core network 102 and convert these for transmission over a wireless interface to a User Equipment 105 in the macrocell 101.

In this example, the eNode B 103 is a distributed radio base station and comprises at least one radio equipment portion (RE) 106 and at least one radio equipment control portion (REC) 107. The REC 107 may be linked to the MME 104 and the RE 106 may be coupled to an antenna 108 which may communicate wirelessly with a User Equipment 105 located within the macrocell's area of coverage 101.

In such a distributed eNode B, information transfer between the radio equipment control (REC) portion 107 and the radio equipment (RE) portion 106 may occur by use of a parallel control word transmitted over an internal interface, for example the co-called Common Public Radio Interface (CPRI) schematically shown as a link 109 in FIG. 1. Data communication by the REC 107 with the core network side of the eNode B 103, as well as data communication by RE 106 with the antenna side of the node B 203, may occur by serial communication.

The REC 107 and RE 106 may be physically separated. For example, the RE 106 may be close to the antenna 108 and the REC 107 may be located in a conveniently accessible site. Alternatively, both REC 107 and RE 106 may be co-located.

Figure 2:
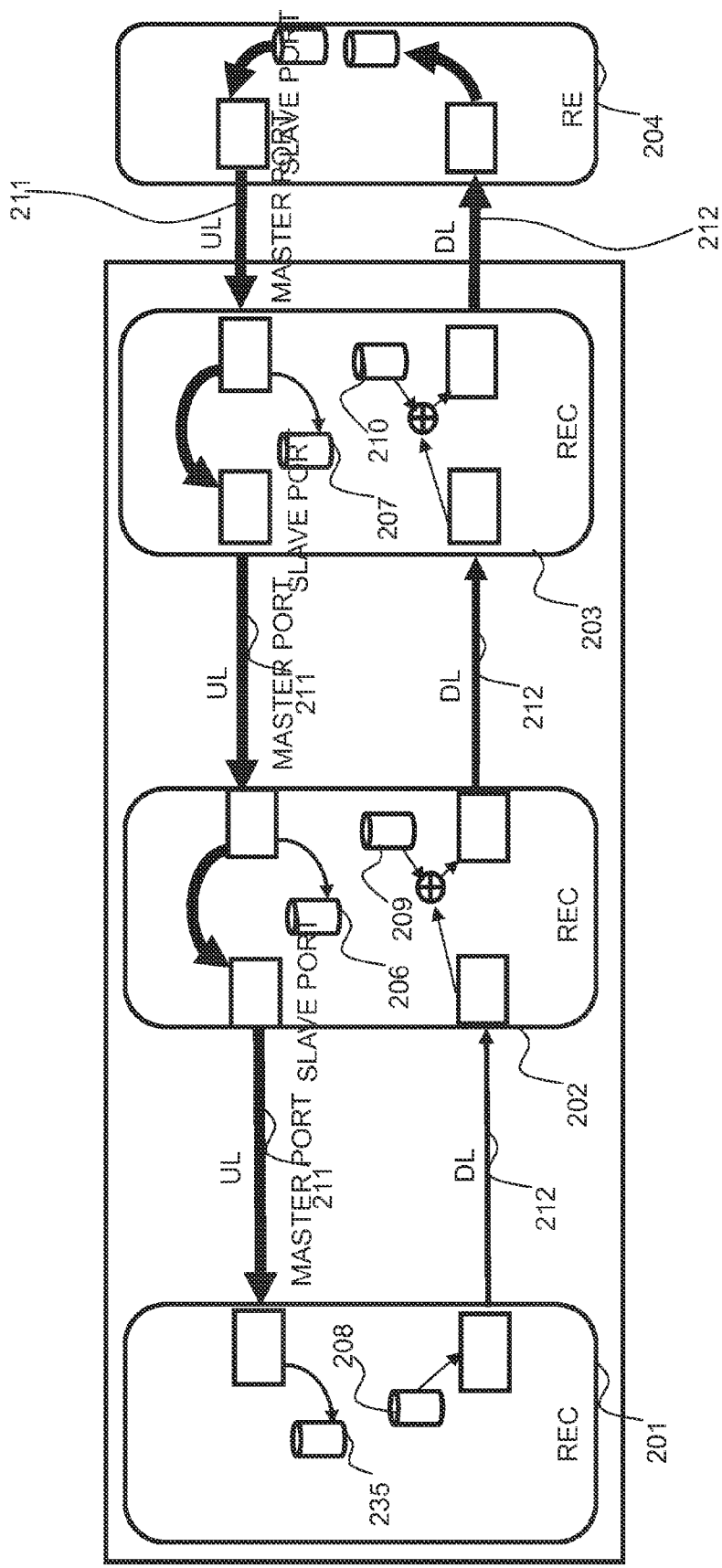
FIG. 2 is a simplified block diagram of an example of an apparatus for processing data flows.

FIG. 2 shows, schematically, part of a base station, such as the eNode B of FIG. 1 for example, comprising an end-point REC 201 and first and second networking RECs 202 and 203, respectively, connected in a chain configuration. A master port of the end-point REC 201 is connected with a slave port of the first networking REC 202, a master port of the first networking REC 202 is connected with a slave port of the second networking REC 203 and a master port of the second networking REC 203 is connected with a slave port of an RE 204, All RECs in the chain see the entire uplink IQ data and processing of AxCs may be distributed between them. For example, for each REC 201-203, the data of the AxCs which are to be processed are read into receive buffers 205, 206, 207 located in each REC 201, 203, 203, respectively. In the downlink 212, IQ data may be aggregated so that data of the AxCs processed by each REC are read from transmit buffers 208, 209, 210 and added to the data flow originating from the end-point REC 201, through the networking RECs 202, 203 and to the RE 204.

Figure 3:
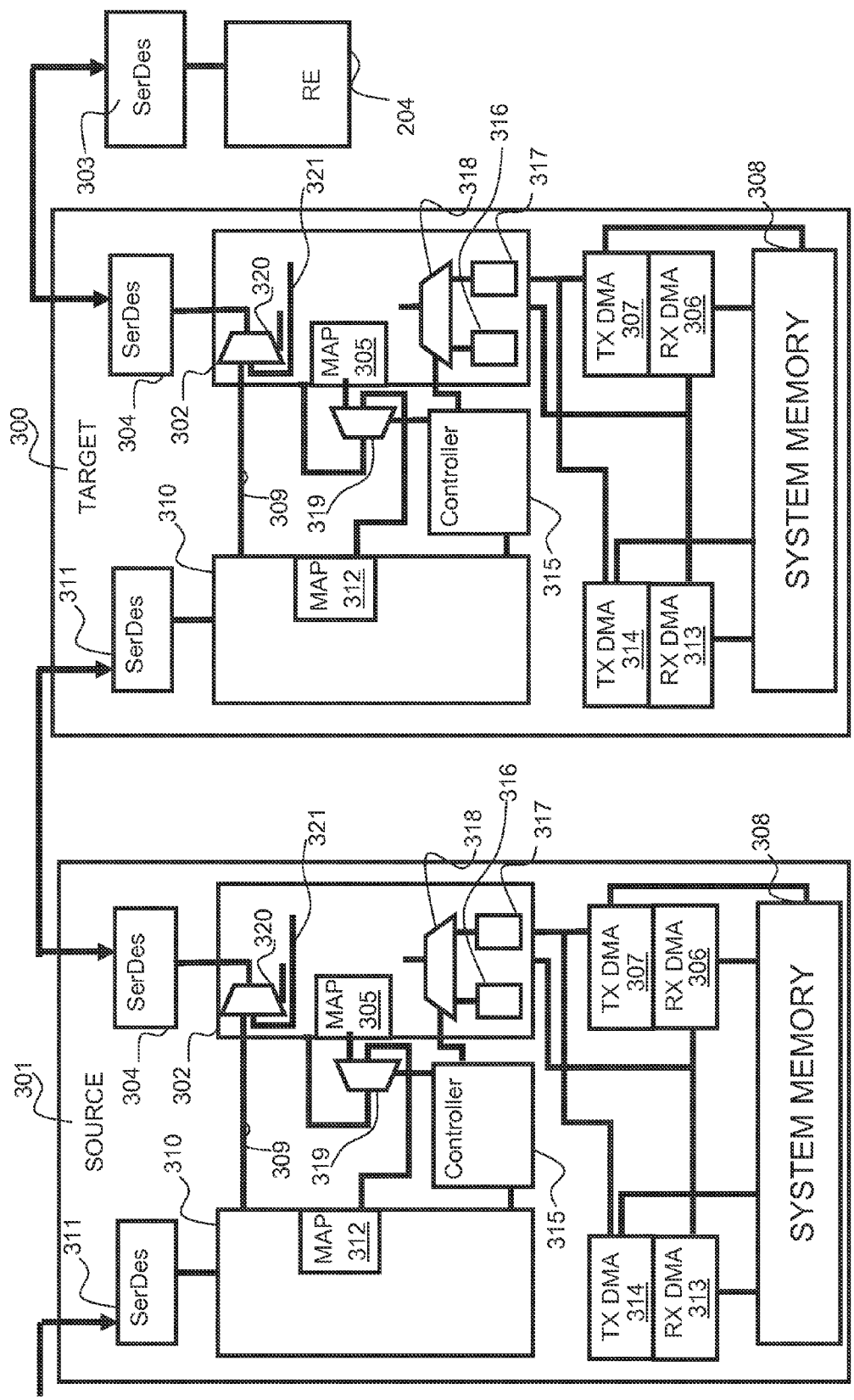
FIG. 3 is a simplified block diagram of an example of a part of the apparatus of FIG. 2 shown in greater detail.

FIG. 3 illustrates in more detail a system for processing data flows. In this example, communications data may be received from and transmitted to the RE 204 of FIG. 2 and the module 300 may be included in the REC 203 of FIG. 2. The module 300 may be "daisy-chained" with one or more like modules of FIG. 2. (One further module 301 is shown in FIG. 3 as an example and may be included in the REC 202 of FIG. 2).

Each data flow processing module 300, 301 may include a first framer 302 which may be operably coupled to the RE 204 though serialiser/de-serialiser interfaces. 303 and 304 included in the RE 204 and first framer 302 respectively. The first framer may also include a mapping table 305. The modules 300 301 may also each include a first receive Direct Memory Access module (DMA1) 306 and a first transmit DMA 307. The transmit and receive DMAs 306, 307 may be operably coupled to the first framer 302 and be arranged to access a system memory 308.

The first framer and the transmit and receive DMAs may comprise a first "CPRI lane" which handles the reception and transmission of the AxC data on a CPRI link. Control and Management data may also be transmitted and received using the HDLC and/or Ethernet protocols, for example. A receive function of the first framer 302 may extract antenna carrier data from a CPRI frame and transfer it to the receive DMA 306. The receive DMA may then transfer the AxC data to buffers mapped in the system memory 308 with each receive antenna carrier being stored in a different buffer mapped in the system memory.

The first framer 302 may be operably coupled via an auxiliary interface link 309 to a second framer 310 which may also be operably coupled to a first framer of a subsequent REC in the chain through a serialiser/de-serialiser interface 311 included in the second framer 310. In this way, AxCs to be processed by subsequent RECs in a chain may be transmitted onwards. The second framer 310 may also include a mapping table 312. The modules 300 and 301 may also include a second receive Direct Memory Access module (DMA) 313 and a second transmit DMA module 314. The second receive and transmit DMAs 313, 314 may be operably coupled to the first framer 302 and to the system memory 308. The second framer and the second transmit and receive DMAs may comprise a second CPRI lane. Each processing module 300, 301 may also be provided with a controller 315 which may comprise a digital signal processing core, a general purpose processor, a microcontroller or DSP or similar core or device which is capable of reconfiguring each processing module between a first and second modes of operation to be described below.

Each framer may also include or have access to registers which determine buffer addresses, whether or not received data should be transferred to system memory and which antenna carriers are active. Data to be transmitted may be transferred from the system memory 308 to the first framer 302 by the transmit DMA 307. Each transmit antenna data carrier is stored in a different buffer mapped in the system memory 308. Registers may determine buffer addresses, whether or not stored data should be transferred to the first framer and which antenna carriers are active.

In this example, each framer 302 includes a register 316 and a shadow register 317. A first selector module 318, which may comprise a multiplexer, may be included for selecting between the register 316 and the shadow register 317, thus reconfiguring the framer between a first mode and a second mode of operation. The first selector module 318 may be controlled by the controller 315.

In one embodiment which employs an advanced mapping method, a second selector module 319, which may comprise a multiplexer, may be included for selecting between the mapping table 305 of the first framer 302 and the mapping table 312 of the second framer 310, thus reconfiguring the framer 302 between a first mode and a second mode of operation. The second selector module 319 may be controlled by the controller 315.

In one embodiment, one or more of the transmit and receive DMA modules 306, 307, 313, 314 may be a multibandwidth DMA such as a dual bandwidth or triple bandwidth DMA In another embodiment, at least one transmit or receive DMA module may be a multi-channel DMA module. In such cases, fewer modules may be required. In other embodiments, the transmit and receive functions may be performed in a single DMA module.

For downlink data flow in the daisy chain configuration, an end-point REC (being the last in the chain and furthest from the RE) commences to transfer a CPRI downlink frame where each subsequent REC can insert AxC data (from their system memories) into pre-determined timeslots in the frame. Mask registers in each framer define whether the transmit data should be driven by the framer's auxiliary port (in forward mode) or by the framer itself (in local mode). For uplink data flow, in the daisy chain configuration, when a CPRI frame arrives at a framer, selected antenna carriers are transferred to system memory and, in parallel, the received frame is transferred as a whole to a second framer for transmission to the next REC in the chain.

In one example, the RE and REC chain configuration of FIGS. 2 and 3 operates within an LTE system with a sampling rate of 20 MHz, a 15 bit sampling width and a 9.8304 Gbps link rate. In a specific example, there can be up to 8 AxCs on the CPRI link (between RE and RECs): AxC0, AxC1, AxC7 where each AxC represents one physical antenna. During the day, all eight AxCs are in service. During the night only 6 AxCs are in service. Each night, different AxCs may be put out of service. As an example, each REC 201-203 can process up to three AxCs. In a day time configuration, AxC0, AxC1 and AxC2 are processed by REC 201, AxC3, AxC4 and AxC5 are processed by REC 202 and AxC6 and AxC7 are processed by REC 203. During night time operation, AxC5 and AxC7 are out of service. As there are only six AxCs in service during night time operation, only two RECs are required for processing all IQ data, therefore one of the RECs could be powered down at night in order to save base station power consumption.

Thus, an on-the-fly (that is to say, without any down-time of the communications link) optimization of the AxC allocation is done when changing from a "day" operation to "night" operation. As an example, AxC7 is deleted from REC 203; AxC5 is deleted from REC 202 and AxC6 is moved from REC 203 to REC 202. As a result, REC 203 can enter a low-power mode. As this is done on-the-fly, the change is transparent to the RE-chain and does not require any reconfiguration of the RE 204.

In one example, an AxC (say AxC6 as mentioned above) which is initially allocated to be received and transmitted by a "source" module 301 in a "source" REC chain may be re-allocated, on the fly, to "target" module 300 in a "target"

REC in the chain. For uplink (receive) operation, module 300 is configured to receive, in parallel with module 301, the re-allocated AxC6. This is done by first configuring the spare receive DMA 313 in the target module to receive AxC6, and then configuring the first framer 302 to receive AxC6. For downlink (transmit) operation, the target module 300 is configured to transmit, instead of the source module 301, AxC6. The transition is done on-the-fly on a radio-frame boundary. This is done by first configuring the spare transmit DMA module 314 in target module 300 to fetch AxC6 from system memory. Next, the first framer 302 is configured to transmit AxC6. Lastly the framer 302 mask is configured, on the fly, to the revised AxC allocation for both source and target modules 300, 301.

Using a basic mapping method, reconfiguration of a framer 302 and a DMA may be done by the controller 315. Reconfiguration may be done according to a predefined timetable which in turn may be set by an operator of the core network 102. For example, configurations may be switched between daytime and night time settings. Alternatively, rather than reconfiguring the framer and DMA in accordance with a predefined (fixed) timetable, it may be done dynamically according to system load. In this case, control and management messages (using Ethernet or HDLC for example) may be employed to inform other network devices of the required changes.

In an advanced mapping mode, the mapping table 305 is reconfigured on the fly. To facilitate this, the unused mapping table 312 of the second framer 310 may be utilised thus saving on additional memory.

For both receive and transmit operation, the spare receive and transmit DMA modules 313,314 of the source module 301 may be disabled thus providing a power saving. Also, AxC6 which, prior to re-configuration of the target module, is fetched from system memory by the (active) transmit DMA 307 in the source module 301 and transferred to its first framer 302, may be disabled in the source module's first framer 302. AxC disabling in a framer may be done under the control of the controller 315 by configuring a receive register in the framer, indicating to the framer not to map (or demap) a specified AxC. It may be done by writing to a certain register where each bit denotes on/off of a specified AxC. The segment used to map this AxC remains empty. In the advanced mapping mode the mapping table may be also updated. Chaining continues in the source module 301 through its framers and serialiser/de-serialiser interfaces. Other functions of the module 301 may be powered down The invention has the advantages of being fully compliant with the CPRI standard and having the capability to "move" on-the-fly a group of AxCs from one REC to another REC2 in an REC-chain configuration, without having to reconfigure the other end of the chain (i.e. the RE-chain).

Figure 4:
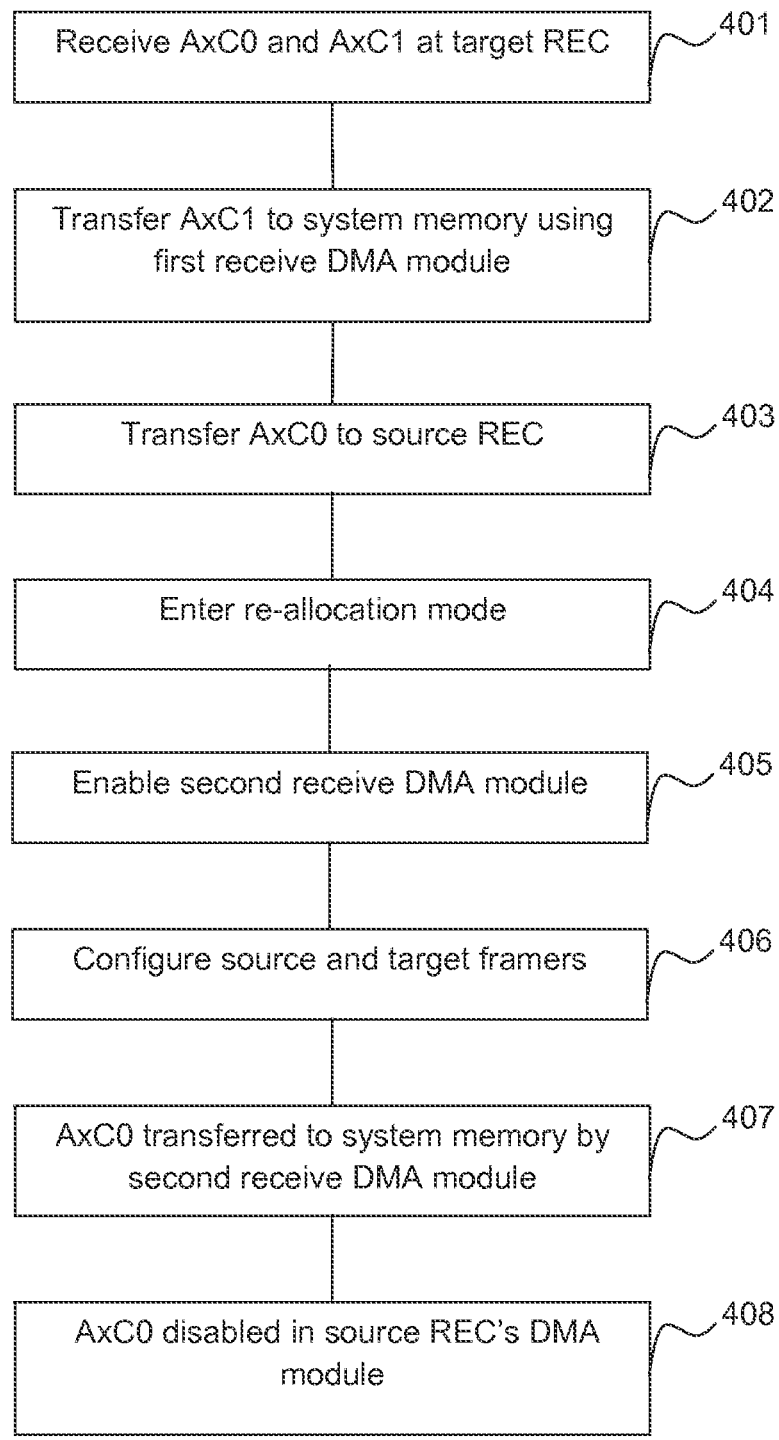
FIG. 4 is a simplified flowchart illustrating an exemplary method of processing data flows in an uplink; and, FIG. 5 is a simplified flowchart illustrating an exemplary method of processing data flows in a downlink.

An example of a method for processing data flows from multiple AxCs by allocating and re-allocating the AxCs between several RECs will now be described with reference to FIGS. 3, 4 and 5, FIGS. 4 and 5 being simplified flowcharts 400, 500 respectively of such an exemplary method. FIG. 4 relates to data flow in an uplink (from a RE) and FIG. 5 relates to data flow in a downlink (to a RE). In the example, the module 300 may be considered to comprise a target REC and the module 301, a source REC. Say that, initially, the source REC 301 is preconfigured to process AxC0 and the target REC 300 is preconfigured to process AxC1.

So, for example, in the uplink (FIG. 4), IQ data blocks comprising AxC0 and AxC1 are transmitted from the RE 204 to the first framer 302 of the target REC 300. At 401, AxC0 and AxC1 are received at the first framer 302 in the target REC 300. At 402, the target REC 300 may transfer AxC1 to system memory 308 using the first receive DMA module 306. At 403, the target REC 301 may transfer AxC0 to the source REC 300 through the daisy chain link between them.

Next, at 404, a re-allocation mode may be entered whereby AxC0 and AxC1 are both to be processed by the target REC 300 and the source REC 301 can enter a low power mode of operation. In the re-allocation mode at 405, the target REC 300 may enable its second receive DMA module 313 so that it may transfer IQ data from the framer 302 into the system memory 308. At 406, the first framer 302 of the target REC 300 may be re-configured so that it may extract AxC0 (in addition to AxC1) from the received IQ data flow. Also, AxC0 may be disabled in the first framer of the source REC. At 407, the target REC 300 may transfer AxC0 from the second receive DMA module 313 to the system memory 308 At 408, the source REC 301 may disable AxC0 in its receive DMA 306. The first receive DMA module 306 of the target REC may transfer AxC1 to the system memory 308.

In one example, when initially entering the re-allocation mode, in the second receive DMA module 313 of the target REC 300, the receive IQ DMA channels for AxC0 may be configured This may include an on/off setting for each AxC. In an alternative embodiment, if the target module 300 includes a single multi-channel DMA module, then instead of enabling the second receive DMA module 313, dedicated channels in the multi-channel DMA may be added or removed. Framer reconfiguration may be done on the Radio Frame minus delta (where delta is the maximal time the reconfiguration may take (depending on the amount of changes needed). It may be, typically, equal to a few hyper frames Alternatively an advanced mapping method may be used. This may use an advanced mapping table which is a bit-based description of the AxC mapping along k basic frames. Its size may be, for example, 21 kBytes for transmit and receive for the case where the maximum K is 48. A shadow memory of 21 kB may be used to replace the existing mask on the boundary of the radio frame minus delta once enabled. Advantageously, the mapping table 312 of the second framer 310 (which, prior to re-allocation, 404, is unused) may be employed for this purpose, thereby obviating any requirement for additional memory.

If a basic mapping method is used (that is one where mapping is solely determined based on number of AxCs and the bandwidth per AxC), then no reconfiguration of the mapping in the framer is required. The relevant data starts to enter the framer memory. During this stage part of the AxCs are deleted and others are re-added. This is done by configuring a register in the framer that has a bit for each AxC to indicate if it is enabled or not. The processor 315 may determine which ones to delete and which ones to add. The receive IQ DMA channels for AxC0 in the source REC may be disabled after any downlink flow has finished. Note that there will be an overlap period of time in which both the source REC and target REC are receiving the same data.

Figure 5:
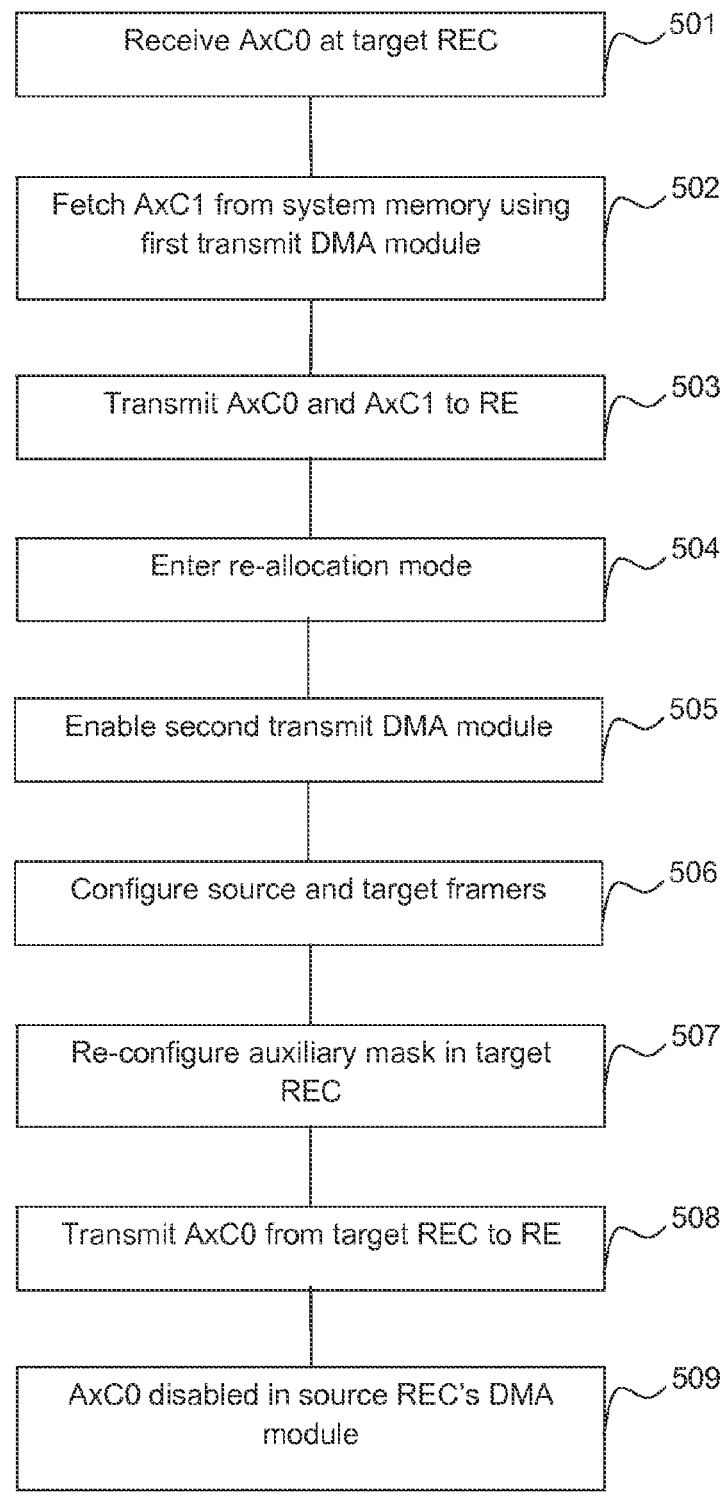

Reference will now be made to FIG. 5 which illustrates dataflow in the downlink. In the first mode of operation, at 501, the target REC 300 receives AxC0 from the source REC 301. At 502, in the target REC 300, AxC1 may be fetched from the system memory 308 using its first transmit DMA module 307. At 503, AxC0 and AxC1 may then be transmitted by the target REC 300 to the RE 204. Next, at 504, a re-allocation mode of operation may be entered whereby AxC0 is to be processed by the target REC 300 and the source REC 301 can be powered down. At 505, the target REC 300 may prepare AxC data in the system memory 308 and then enable its second transmit DMA module 314. At 506, the first framer 302 of the target REC 300 is reconfigured so that it may transfer data from the second transmit DMA module 314 onwards to the RE 204. Also, AxC0 may be disabled in the first framer of the source REC. At 507, the target REC may reconfigure its auxiliary mask 320. At 508, the target REC may transfer AxC0 from the system memory 308 to the second transmit DMA 314 and hence, AxC0 and AxC1 may be transmitted from the target REC 300 to the RE 204 (via the framer 302). At 509, the source REC 301 may disable AxC0 in its transmit DMA module 307.

In one example, when initially entering the re-allocation mode, transmit data (that is downlink data) in the target REC may be prepared in order to match the transmit data at the source REC, assuming that the change will happen on a certain radio-frame boundary (with overlap). At this stage the relevant transmit data is in system memory. In this example, preparing the data means that the same data which was written to a transmit buffer in the system memory for use by the source REC is copied also to a transmit buffer in the system memory to be used by the target REC.

In the second transmit DMA module 314 of the target REC 300, the transmit IQ DMA channels for AxC0 may be configured. This may include an on/off setting for each AxC. In an alternative embodiment, if the target module 300 includes a single multi-channel DMA module, then instead of enabling the second transmit DMA module 314, dedicated channels in the multi-channel DMA may be added or removed.

Framer reconfiguration on the Radio Frame minus delta may be done in a number of ways: In one example, there is provided a 24-bit register 316 (per framer) that has a bit for each AxC to indicate if it is enabled or not. This register 316 may then be used by a DMA module to read data from or write data to the system memory for a specific AxC. The register may be used by the framer to map/demap the specific AxC to the relevant segment according to the mapping mode. In a basic mapping method which has a-priori assumption on the mapping of the AxC, only an update of this register is necessary.

Alternatively, an advanced mapping method may be used whereby the Mapping table 305 in the first framer 302 of the target REC may be reconfigured on-the-fly using a shadow table as mentioned above with reference to the uplink flow.

If a basic mapping method is used (that is, for example, that the mapping is solely determined based on number of AxCs and the bandwidth per AxC), no reconfiguration is required. At this stage the relevant data is in the first framer's memory and part of the AxCs are deleted, and others are added.

An on-the-fly reconfiguration of the first framer's auxiliary mask in transmit (downlink) operation on Radio Frame boundary plus delta may also be done and may be coordinated between the source REC and target REC by the controller 315. This auxiliary mask may be typically a bit-based multiplexer 320 which decides between local IQ data streams on line 321 and those forwarded from a chained REC (the source REC 301 in this example) In one typical example, register maximum size is 1920 bits and the maximum link rate is 9.8304 GHz. To assist with the re-configuration of the framer's auxiliary mask, a shadow register 317 of 1920 bits may be included in the first framer 302, replacing the mask on the boundary of the radio frame plus delta once enabled.

Similar procedures may be performed, in the appropriate sequence, by the source REC 301; that is for example, configuring the receive/transmit IQ DMA channels and receive/transmit IQ framer 302 for AxC0.

In one optional embodiment, an automatic calculation of the load balancing of RECs may be performed. Automatic calculation may be done by the controller 315 using system profiling information, mainly on the loading of the system busses.

The invention may find particular application in metropolitan or small-cell baseband wireless communication systems.

The invention may also be implemented in a computer program for running on a computer system, at least including code portions for performing steps of a method according to the invention when run on a programmable apparatus, such as a computer system or enabling a programmable apparatus to perform functions of a device or system according to the invention. As an example, a tangible computer program product may be provided having executable code stored therein to perform methods for processing data flows according to appended claims. A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks or modules are merely illustrative and that alternative embodiments may merge modules or circuit elements or impose an alternate decomposition of functionality upon various logic blocks or modules or circuit elements. Thus, it is to be understood that the architectures depicted herein are merely exemplary, and that in fact many other architectures can be implemented which achieve the same functionality. Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiment.

The illustrated examples of the various modular components represented in FIG. 3 may be implemented as any number of separate integrated circuits or separate devices interconnected with each other in a suitable manner. Furthermore, the receive and transmit functionality of the discrete DMA modules 306 and 307 may be combined into a single module. Similarly, the receive and transmit functionality of the discrete DMA modules 313 and 314 may be combined into a single module Furthermore the processing module 300 may be implemented in one or several integrated circuits.

For example, an integrated circuit device may comprise one or more dies in a single package with electronic components provided on the dies that form the modules and which are connectable to other components outside the package through suitable connections, such as pins of the package and bondwires between the pins and the dies Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A method of processing data flows comprising in-phase and quadrature (IQ) data of a plurality of antenna carriers (AxC) flowing between a plurality of processing modules arranged in a chain configuration, each processing module including a framer, the method comprising:
    configuring a source processing module to process IQ data of a first AxC in a first mode of operation, and
    re-configuring a target processing module to process the IQ data of the first AxC instead of the source processing module in a second mode of operation by enabling a direct memory access module in the target processing module to transfer the IQ data of the first AxC between a memory and the framer of the target processing module and disabling the first AxC in the source processing module.

2. The method of claim 1 including; in the first mode of operation, in the target processing module, receiving on an uplink at a framer, IQ data of at least one AxC, transferring IQ data of a first AxC comprising said received IQ data from the framer to a subsequent processing module in the chain, and in a second mode of operation, transferring IQ data of the first AxC from the framer to a memory using a receive Direct Memory Access module.

3. The method of claim 1 including in the first mode of operation, in the target processing module, receiving on a downlink at a framer, IQ data of the first AxC, transferring IQ data of the first AxC comprising said received IQ data from the framer to a subsequent processing module in the chain, and in the second mode of operation, transferring IQ data of the first AxC from the memory to the subsequent processing module in the chain using a transmit Direct Memory Access module.

4. The method of claim 1 comprising, on entering the second mode of operation, updating a register which has a bit for each AxC which indicates whether an AxC received by the framer is enabled or not.

5. The method of claim 1 wherein on entering the second mode of operation, a mapping table of a framer is re-configured.

6. An apparatus for processing data flows comprising in-phase and quadrature (IQ) data of a plurality of antenna carriers flowing between a plurality of processing modules arranged in a chain configuration, comprising:
a source processing module and a target processing module each being provided with a controller, a framer and a direct memory access module, wherein:
the controller is arranged to:
configure the source processing module to process IQ data of a first AxC in a first mode of operation, and
configure the target processing module to process the IQ data of the first AxC instead of the source processing module in a second mode of operation by enabling a direct memory access module of the target processing module to transfer the IQ data of the first AxC between a memory and the framer of the target processing module and to disable the first AxC in the source processing module.

7. The apparatus of claim 6 wherein the target processing module includes a receive direct memory access (DMA) module and wherein in the first mode of operation, the framer of the target processing module is arranged to receive on an uplink IQ data of at least one AxC from a preceding processing module and to transfer IQ data of a first AxC comprising said received IQ data to a subsequent processing module in the chain, and wherein in the second mode of operation, the receive DMA module of the target processing module is arranged to transfer said IQ data of the first AxC from the framer of the target processing module to a memory.

8. The apparatus of claim 6 wherein:
the target processing module includes a transmit direct memory access (DMA) module,
in the first mode of operation, the framer of the target processing module is arranged to receive on a downlink IQ data of at least one AxC from a preceding processing module and to transfer IQ data of a first AxC comprising said received IQ data to a subsequent processing module in the chain, and
in the second mode of operation, the transmit DMA module of the target processing module is arranged to transfer said IQ data of the first AxC from a memory to a subsequent processing module in the chain.

9. The apparatus of claim 6 including a first selector module for selecting a register for reconfiguring a framer between first and second modes of operation.

10. The apparatus of claim 6 including a second selector module for selecting a mapping table for reconfiguring a framer between first and second modes of operation.

11. The apparatus of claim 8 wherein at least one of the receive and transmit DMA modules is a multichannel DMA module.

12. The apparatus of claim 6 wherein the apparatus is implemented in one or more integrated circuit devices.

* * * * *